United States Patent
Murrin et al.

(10) Patent No.: US 8,037,879 B2
(45) Date of Patent: Oct. 18, 2011

(54) HEAT DISTRIBUTING WAVE TRAY FOR A GRILL

(75) Inventors: Ryan S. Murrin, South Bend, IN (US); Joel M. Sells, Watervliet, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 64 days.

(21) Appl. No.: 12/258,474

(22) Filed: Oct. 27, 2008

(65) Prior Publication Data
US 2010/0101558 A1    Apr. 29, 2010

(51) Int. Cl.
F24C 3/00 (2006.01)
F24C 3/04 (2006.01)
A47J 37/07 (2006.01)
A47J 27/02 (2006.01)
F23D 14/14 (2006.01)

(52) U.S. Cl. ............. 126/39 B; 99/447; 99/400; 99/401; 99/445; 99/450; 126/9 R; 126/39 D; 126/39 H; 126/39 N; 126/39 J; 126/39 K; 126/41 R; 126/25 R

(58) Field of Classification Search ................ 126/39 R, 126/41 R, 39 B, 25 R, 9 R, 39 D, 39 H, 39 N, 126/39 J, 39 K; 99/447, 400, 446, 401, 445, 99/450, 396; 219/209
See application file for complete search history.

(56) References Cited

U.S. PATENT DOCUMENTS

| | | | |
|---|---|---|---|
| 4,034,662 | A | 7/1977 | McLane |
| 4,878,477 | A | 11/1989 | McLane |
| D344,434 | S | 2/1994 | Endara |
| 5,752,433 | A | 5/1998 | Charlson et al. |
| 5,755,154 | A | 5/1998 | Schroeter et al. |
| 5,806,412 | A | 9/1998 | Bedford et al. |
| 5,878,739 | A | 3/1999 | Guidry |
| 6,024,081 | A | 2/2000 | Libertini, Jr. |
| 6,260,478 | B1 | 7/2001 | Harneit |
| 6,283,114 | B1 | 9/2001 | Giebel et al. |
| 6,314,871 | B1 * | 11/2001 | Holbrook et al. ............... 99/401 |
| 6,966,253 | B2 * | 11/2005 | Witzel ............................ 99/400 |
| 7,241,466 | B2 * | 7/2007 | Dellinger ...................... 426/523 |

* cited by examiner

*Primary Examiner* — Kenneth Rinehart
*Assistant Examiner* — William Corboy
(74) *Attorney, Agent, or Firm* — Tara M. Hartman; Diederiks & Whtielaw, PLC

(57) ABSTRACT

A heat distributing tray for use in a barbecue grill includes a corrugated unitary body of heat conducting material having alternating solid and grated walls which define channels. More specifically, the body includes first and second side portions defined by both solid walls which extend at gradually decreasing angles with respect to a common horizontal plane and varying length grated walls interconnecting the solid walls. In use, the tray is placed over one or more heating elements in a barbecue housing, with radiant and convective heat from the heating element being optimally distributed throughout the entire interior portion of the barbecue grill due to the relative structure and configuration of the solid walls in relation to the grated walls.

20 Claims, 3 Drawing Sheets

HEAT DISTRIBUTING WAVE TRAY FOR A GRILL

BACKGROUND OF THE INVENTION

1. Field of the Invention

The present invention pertains to the art of grilling and, more particularly, to a heat distributing wave tray for grilling, such as on a barbecue grill.

2. Description of the Related Art

In general, gas or electric barbecue grills include one or more tube burners or cooking elements located beneath one or more radiant panels adapted to improve heat distribution across the entire surface of the grill. One example of such an appliance can be seen in U.S. Pat. No. 6,314,871, wherein a plurality of uniform, undulating panels are utilized over a U-shaped burner. Although such panels improve heat distribution to some extent, the uniform nature of the panels does not address grill specific burner placement. One attempt to address the distribution of heat from a specific burner location can be seen in U.S. Pat. No. 5,806,412, which depicts a baffle having holes of various sizes and locations designed to control the combustion gas travel pattern within a gas grill. However, such a baffle is not seen to adequately address the distribution of both radiant and convective heat within the barbecue grill. Therefore, there is seen to be a need in the art for a heat distribution system adapted to improve both convective and radiant heat distribution within a grill, particularly a grill having a single burner or cooking element.

SUMMARY OF THE INVENTION

The present invention is directed to a heat distributing tray having a corrugated unitary body of heat conducting material. Legs extend downwardly from the body and provide a means for supporting the tray within a barbecue grill. The corrugated structure of the body defines a plurality of grated walls and solid walls which, in turn, define channels. In accordance with the present invention, the tray is adapted to be placed over a heat source and includes first and second symmetrically constructed side portions. More specifically, each of the first and second side portions include a plurality of solid walls, each of which has a distinct angle with respect to a common horizontal plane. Preferably, the angles of the solid walls progressively decrease from the solid wall closest to a first end of the tray to the solid wall closest to the second portion.

In use, heated air from the burner accumulates underneath on both sides of the channels and is distributed along the length of the tray. The specific angled configuration of the flat walls in combination with the arrangement of the grated walls is considered to direct both convective and radiant heat in an optimal manner such that heat from the burner is distributed evenly throughout the interior housing of the barbecue grill. In this manner, food placed on grilling racks above the tray is heated in an extremely even manner.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF PREFERRED EMBODIMENTS

Figure 1:
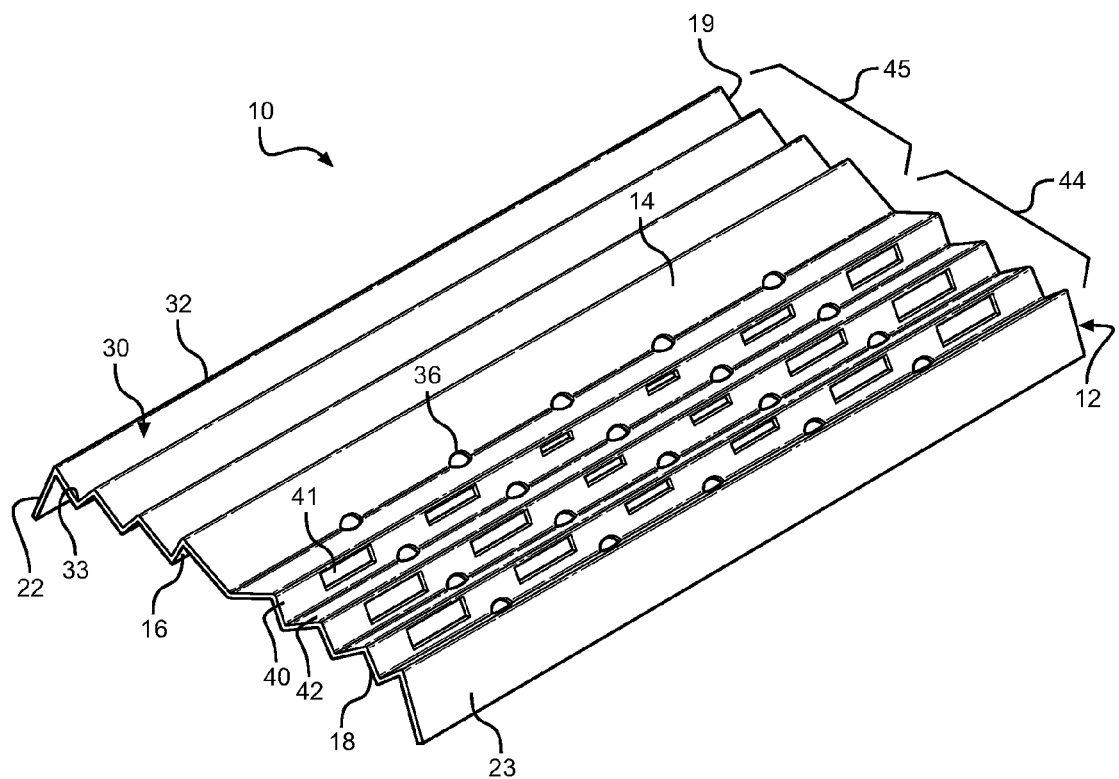
FIG. 1 is a perspective view of the heat distributing tray of the present invention.
Figure 2:
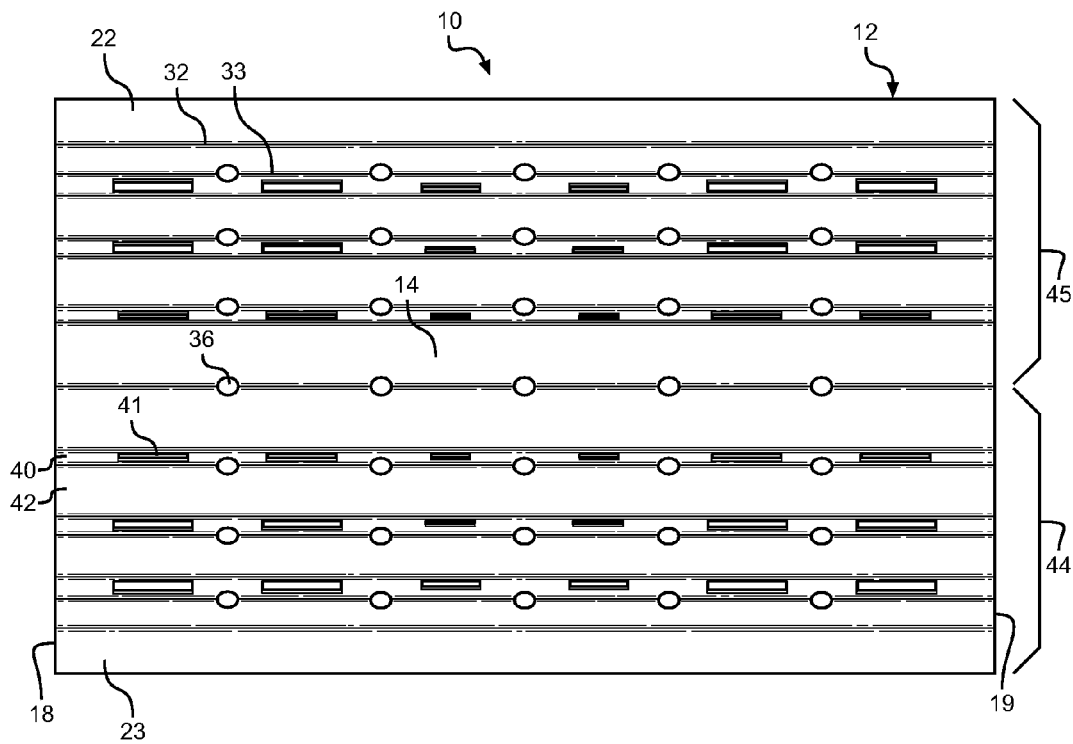
FIG. 2 is a top view of the heat distributing tray depicted in FIG. 1.

With initial reference to FIGS. 1 and 2, a heat distributing tray constructed in accordance with the present invention is indicated at 10. In general, tray 10 is constituted by a corrugated unitary body 12 of heat conducting material, such as steel. Unitary body 12 includes an upper surface 14, a lower surface 16, first and second, longitudinally spaced opposing side edges 18 and 19, and first and second opposing downwardly extending legs 22 and 23. As shown, legs 22 and 23 extend downwardly from unitary body 12 away from upper surface 14 and provide a means for supporting tray 10. The corrugated structure of unitary body 12 defines a plurality of spaced, substantially parallel channels 30 that extend from first side edge 18 to second side edge 19. In general, channels 30 are defined by respective peaks or crests 32 and troughs 33. A plurality of longitudinally spaced drainage apertures 36 preferably extend through each trough 33 in order to allow any fluids collected on upper surface 14 during a cooking operation to drain out of tray 10. Each channel 30 is further defined by both a grated wall 40 having a series of longitudinally spaced elongated apertures 41 therein, and a solid wall 42. Apertures 41 are strategically positioned such that combustion gases from below tray 10 are distributed to cool spots on upper surface 14 as will be discussed in more detail below.

Figure 3:
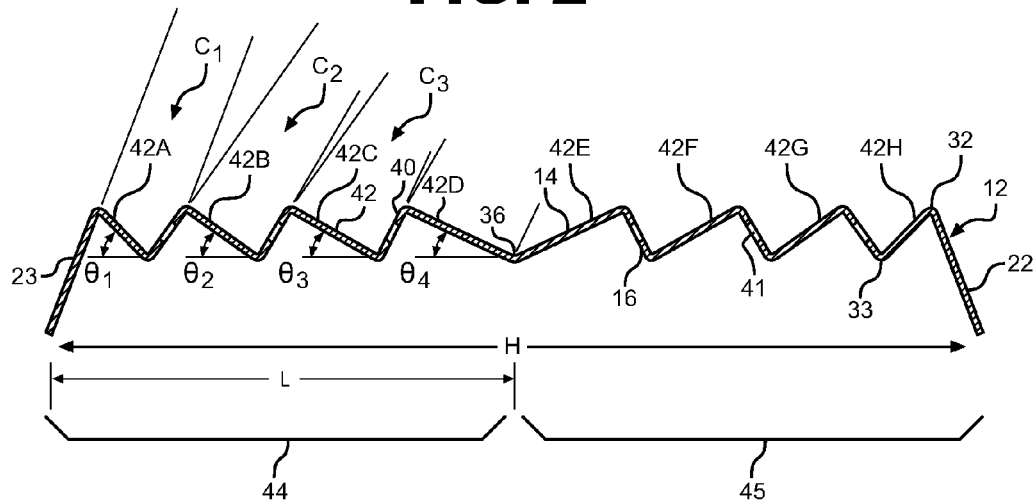
FIG. 3 is a cross-sectional side view of the heat distributing tray of FIG. 1.

In accordance with the present invention, tray 10 is divided into a first side portion 44 and a second side portion 45. At this point, it should be noted that first and second side portions 44 and 45 are preferably, symmetrically constructed. Therefore, complete details of the construction of first side portion 44 will be provided below and it is to be understood that second side portion 45 has commensurate structure. With reference to FIG. 3, it can be seen that first side portion 44 includes a plurality of solid walls 42, each of which has a distinct angle $\theta_1$-$\theta_4$ with respect to a common horizontal plane. In a preferred embodiment, for example, a first solid wall 42A has an angle $\theta_1$ of approximately 45°, a second solid wall 42B has an angle $\theta_2$ of approximately 35°, a third solid wall 42C has an angle $\theta_3$ of approximately 30° and a fourth solid wall 42D has an angle $\theta_4$ of approximately 25° with respect to a horizontal plane. Although the exact angles employed can vary, the angle of solid walls 42A-42D preferably, progressively decreases from adjacent leg 23 towards a symmetrical centerline (not separately labeled) between first and second side portions 44 and 45 of tray 10, i.e., from solid wall 42A to solid wall 42D closest to second side portion 45. Preferably, the angles associated with solid walls 42E-42H have correspondingly varying angles with respect to a horizontal plane such that first and second side portions 44 and 45 are symmetrical, i.e., basically mirror images of each other from the centerline.

Although the exact dimensions of tray 10 can vary, in one preferred embodiment, first side portion 44 has a length of approximately 139 mm, and the entire tray 10 has a length H of approximately 278 mm. Due to the varying angles $\theta_1$-$\theta_4$ of the channels, each channel $C_1$-$C_3$ is defined by solid walls 42A-C and grated walls 40A-C having different lengths. For instance, in the most preferred embodiment shown, a first channel $C_1$ is defined by solid wall 42A having an approximate length of 24.11 mm and grated wall 40A having an approximate length of 18.70 mm; a second channel $C_2$ is defined by solid wall 42B having an approximate length of 25.58 mm and grated wall 40B having an approximate length of 17.78 mm; and a third channel $C_3$ is defined by solid wall 42C having an approximate length of 29.62 mm and a grated wall 40C having an approximate length of 16.99 mm. In addition, fourth solid wall 42D preferably has an approximate length of 36.19 mm. As described above, the lengths of the solid walls 42A-42C of first side portion 44 increase towards the second side portion 45.

Figure 4:
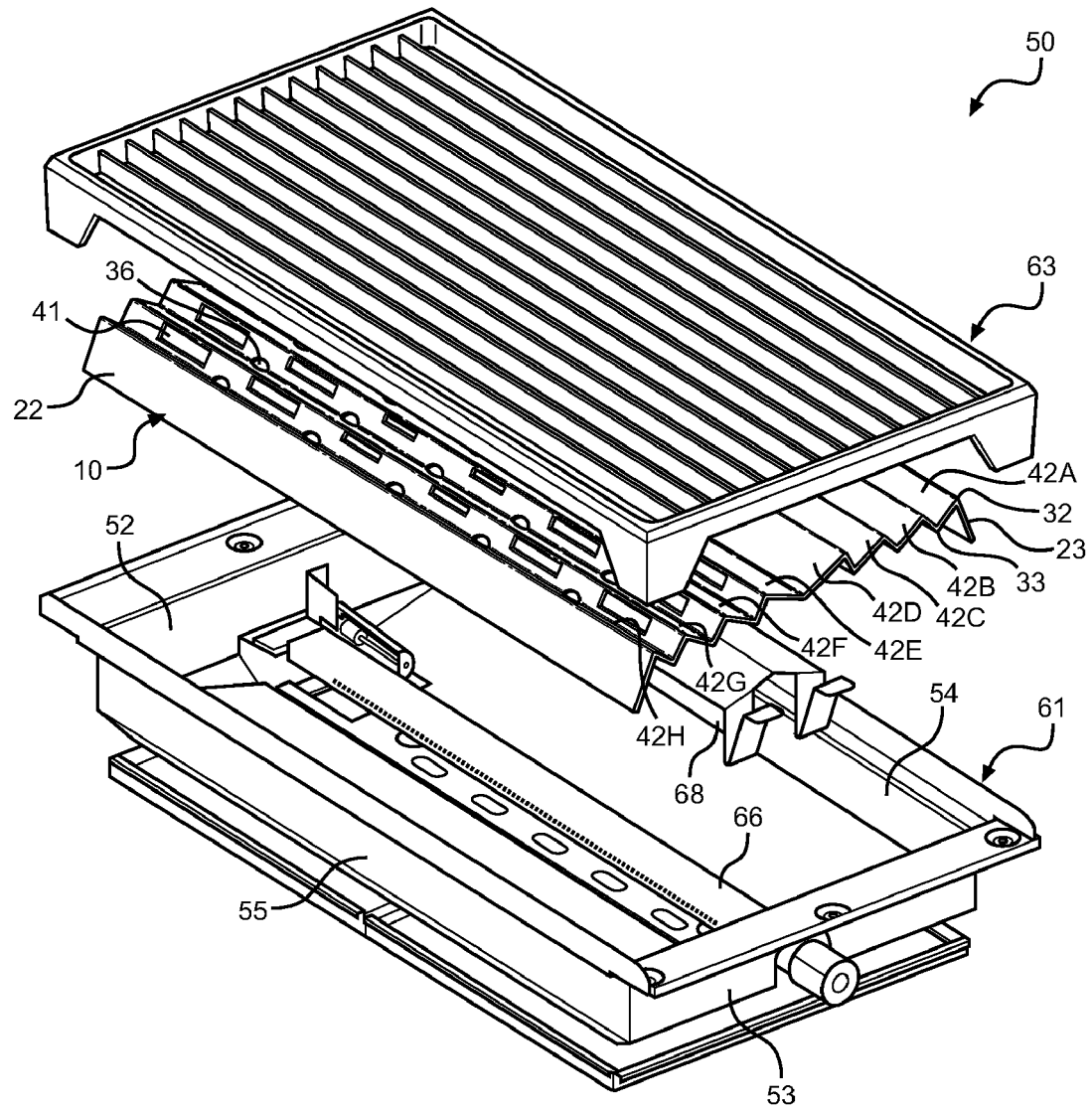
FIG. 4 is an exploded perspective view of the heat distributing tray of FIG. 1 placed in a barbecue grill.

The manner in which tray 10 is intended to be utilized will now be discussed with reference to FIG. 4. A barbecue grill is generally indicated at 50. Grill 50 includes opposing side walls 52 and 53 and respective front and rear walls 54 and 55 which collectively define an interior portion (not labeled) of a grill housing 61. Grill housing 61 is adapted to support one or more grilling racks 63 in a manner known in the art. A burner tube 66 is shown extending longitudinally within grill housing 61. Additionally, a heat dissipater unit 68 is adapted to cover burner tube 66 is shown. Although not important to the present invention and therefore not depicted in this figure, grill 50 can include a frame, supports, controls, a blower and other features known in the art. Although only one burner 66 is depicted, it should be understood that additional burners may be present.

In use, tray 10 is inserted into interior portion 60 above heat dissipater unit 68 such that first and second downwardly extending legs 22 and 23 are supported by grill housing 61. In use, heated air or combustion gases from burner 66 accumulates underneath peaks 32 of tray 10 and heated air is distributed along the length of tray 10. The specific varying angle and length configurations for flat, solid walls 42 with respect to grated walls 40, along with the spaced location of apertures 41, synergistically function to effectively and efficiently direct both convective and radiant heat in an optimal manner such that heat from burner 66 is distributed evenly to rack 63 positioned over tray 10. In this manner, food placed on rack 63 can be uniformly heated, resulting in more consistent cooking.

Although described with reference to a preferred embodiment of the invention, it should be readily understood that various changes and/or modifications can be made to the invention without departing from the spirit thereof. For instance, although shown with a burner located at the center portion of the barbecue housing, it should be understood that the tray of the present invention can be oriented to cover one or more burners located at various locations in the housing. In general, the invention is only intended to be limited by the scope of the following claims.

What is claimed is:

1. A heat distributing tray for use with a grill comprising: a corrugated unitary body of heat conducting material adapted to be positioned over a heating element and having an upper surface, a lower surface, and first and second opposing side edges, said unitary body including a first side portion and a second side portion, each of the first and second side portions including a plurality of substantially parallel troughs extending longitudinally from the first side edge to the second side edge, wherein each of the plurality of troughs is defined by a grated wall having apertures therein and a solid wall, and wherein each of the grated walls are spaced from one another and extend at distinct angles with respect to a common horizontal plane.

2. The heat distributing tray of claim 1, further including first and second opposing downwardly extending legs adapted to support the tray within a barbecue grill.

3. The heat distributing tray of claim 1, wherein each of the troughs is provided with a plurality of spaced drainage apertures.

4. The heat distributing tray of claim 1, wherein the lengths of the solid walls of the first side portion progressively increase towards the second side portion.

5. The heat distributing tray of claim 1, wherein the angles of the solid walls of the first side portion relative to a horizontal plane progressively decrease toward the second side portion.

6. The heat distributing tray of claim 5, wherein the second side portion is a mirror image of the first side portion from a symmetrical centerline.

7. The heat distributing tray of claim 5, wherein the first side portion includes a first solid wall having an angle relative to the horizontal plane of approximately 45 degrees.

8. The heat distributing tray of claim 7, wherein the first side portion further includes a second solid wall having an angle relative to the horizontal plane of 35 approximately degrees.

9. The heat distributing tray of claim 8, wherein the first side portion further includes a third solid wall having an angle relative to the horizontal plane of 30 approximately degrees.

10. The heat distributing tray of claim 9, wherein the first side portion further includes a fourth solid wall having an angle relative to the horizontal plane of 25 approximately degrees.

11. A barbecue grill comprising:
a housing having an interior portion defined by first and second opposing side walls and opposing front and rear walls;
a heating element extending within the housing; and
a heat distributing tray including a corrugated unitary body of heat conducting material positioned over the heating element and having an upper surface, a lower surface, and first and second opposing side edges, said unitary body including a first side portion and a second side portion, each of the first and second side portions including a plurality of substantially parallel troughs extending longitudinally from the first side edge to the second side edge, wherein each of the plurality of troughs is defined by a grated wall having apertures therein and a solid wall, and wherein each of the grated walls are spaced from one another and extend at distinct angles with respect to a common horizontal plane.

12. The barbecue grill of claim 11, wherein the heat distributing tray further includes first and second opposing downwardly extending legs supporting the tray within the housing.

13. The barbecue grill of claim 11, wherein each of the troughs is provided with a plurality of spaced drainage apertures.

14. The barbecue grill of claim 11, wherein the lengths of the solid walls of the first side portion progressively increase towards the second side portion.

15. The barbecue grill of claim 11, wherein the angles of the solid walls of the first side portion relative to a horizontal plane progressively decrease toward the second side portion.

16. The barbecue grill of claim 15, wherein the second side portion is a mirror image of the first side portion from a symmetrical centerline.

17. The barbecue grill of claim 15, wherein the first side portion includes a first solid wall having an angle relative to the horizontal plane of 45 approximately degrees.

18. The barbecue grill of claim 17, wherein the first side portion further includes a second solid wall having an angle relative to the horizontal plane of 35 approximately degrees.

19. The barbecue grill of claim 18, wherein the first side portion further includes a third solid wall having an angle relative to the horizontal plane of 30 approximately degrees.

20. The barbecue grill of claim 19, wherein the first side portion further includes a fourth solid wall having an angle relative to the horizontal plane of 25 approximately degrees.

\* \* \* \* \*